US008921452B2

(12) United States Patent  
Ohashi et al.

(10) Patent No.: US 8,921,452 B2  
(45) Date of Patent: *Dec. 30, 2014

(54) RESIN COMPOSITION CONTAINING ULTRAFINE SILVER PARTICLES

(75) Inventors: Kazuaki Ohashi, Kanagawa (JP); Yasuhiro Kosaka, Kanagawa (JP); Shigeru Suzuki, Osaka (JP); Takahiro Kawakami, Osaka (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 13/697,609

(22) PCT Filed: Jun. 1, 2011

(86) PCT No.: PCT/JP2011/062621  
§ 371 (c)(1),  
(2), (4) Date: Nov. 13, 2012

(87) PCT Pub. No.: WO2011/152467  
PCT Pub. Date: Dec. 8, 2011

(65) Prior Publication Data  
US 2013/0059944 A1  Mar. 7, 2013

(30) Foreign Application Priority Data

Jun. 1, 2010 (JP) ................................. 2010-125723

(51) Int. Cl.  
C08L 3/20 (2006.01)  
C08J 3/22 (2006.01)  
C08K 13/06 (2006.01)  
C08K 9/04 (2006.01)  
C08L 101/00 (2006.01)  
C08K 5/00 (2006.01)  
C08K 5/098 (2006.01)

(52) U.S. Cl.  
CPC .............. *C08K 5/0058* (2013.01); *C08K 5/098* (2013.01)  
USPC ............................ 523/122; 524/301; 524/780

(58) Field of Classification Search  
CPC .. C08K 3/10; C08K 2003/2286; A61K 31/19; A61K 31/28; A61K 2300/00; A01N 59/16  
USPC ..................................... 523/122; 524/301, 780  
See application file for complete search history.

(56) References Cited

U.S. PATENT DOCUMENTS

| 8,106,228 | B2 | 1/2012 | Ohashi et al. |
| 8,124,169 | B2 * | 2/2012 | Ylitalo et al. ..................... 427/8 |
| 2010/0010130 | A1 | 1/2010 | Ohashi et al. |
| 2011/0028313 | A1 | 2/2011 | Ohashi et al. |

FOREIGN PATENT DOCUMENTS

| CN | 101402802 | 4/2009 |
| JP | 9-75434 | 3/1997 |
| JP | 9-108317 | 4/1997 |
| JP | 2003-88549 | 3/2003 |
| JP | 2003-205023 | 7/2003 |
| JP | 2005-169266 | 6/2005 |
| JP | 2006-109902 | 4/2006 |
| JP | 2006-348213 | 12/2006 |
| WO | 2008/029932 | 3/2008 |
| WO | 2009/107720 | 9/2009 |
| WO | 2009/108158 | 9/2009 |

OTHER PUBLICATIONS

Search report from International Application No. PCT/JP2011/062621, mail date is Aug. 2, 2011.  
Chinese office action in Chinese Patent Application 201180027228.4, dated Aug. 20, 2013 along with an english translation thereof.  
Search report from E.P.O. in EP 11789869.2, mailed Jul. 7, 2014.

* cited by examiner

*Primary Examiner* — Nathan M Nutter  
(74) *Attorney, Agent, or Firm* — Greenblum & Bernstein, P.L.C.

(57) ABSTRACT

[Problems] To provide a resin composition containing ultrafine silver particles and having excellent antibacterial property as well as excellent deodorizing power against both the nitrogen type smelling components and the sulfur-containing smelling components.

[Means for Solution] A resin composition obtained by heating and mixing a resin composition, a silver carboxylate and a carboxylic acid together. A thermoplastic resin, the silver carboxylate and the carboxylic acid are heated and mixed together at a temperature lower than a temperature at which the silver carboxylate starts decomposing but not lower than a melting point of the thermoplastic resin.

8 Claims, No Drawings

RESIN COMPOSITION CONTAINING ULTRAFINE SILVER PARTICLES

TECHNICAL FIELD

This invention relates to a resin composition having antibacterial and deodorizing properties. More specifically, the invention relates to a resin composition which is capable of deodorizing both sulfur-containing smelling components and amine-type smelling components yet featuring excellent antibacterial properties.

BACKGROUND ART

A variety of substances have heretofore been proposed for use being added to thermoplastic resins to impart the molded articles thereof with deodorizing function or antibacterial function or with both of these functions.

As for the deodorizing function, it has been known that a wide range of smelling components can be deodorized by using, for example, inorganic fillers such as activated carbon, porous zeolite or sepiolite, or by using a titanium oxide to which photo-catalytic action is applied (patent document 1). The deodorizing method that uses the inorganic filler, however, is based on the adsorption and removal of bad-smelling components by the porous substance, and no longer maintains its effect if the amount of adsorption exceeds a predetermined level. The titanium oxide which oxides and decomposes bad-smelling components by the photo-catalytic action, requires a source of light, and works to oxidize and degrade not only the bad-smelling components but also the carrier that is in contact with the catalyst, arousing a problem in that a special technical countermeasure is necessary. There has, further, been proposed a deodorant using ultrafine particles of a metal, i.e., a deodorant containing a colloidal solution of ultrafine metal particles obtained by reducing a metal ion-containing solution as an effective component (patent document 2). It has been known that the colloid of ultrafine metal particles has a high deodorizing property as well as antibacterial property. Due to its very strong aggregating property, however, it is very difficult to store the above deodorant for extended periods of time in a stable state, or to stably disperse the deodorant in the matrixes of the thermoplastic resins or of the coating material components while preventing the particle thereof from being aggregated together.

On the other hand, in an attempt to produce a resin composition containing ultrafine metal particles having a narrow particle size distribution which are stably dispersed therein and to produce molded articles thereof by a very simple and widely employed method, the present inventors have proposed a method of forming ultrafine metal particles in a molded resin article by heating and molding a mixture of an organic compound of a metal and a resin at a temperature not lower than a temperature at which the organic compound of a metal starts thermally decomposing but lower than a temperature at which the resin deteriorates (patent document 3). The present inventors have also clarified that the resin composition that uses the ultrafine metal particles as an effective component for producing deodorizing function and antibacterial function, excels in deodorizing bad-smelling components such as methyl mercaptan and the like and in exhibiting antibacterial property against colon bacillus etc. (patent documents 4 and 5).

PRIOR ART DOCUMENTS

Patent Documents

Patent document 1: JP-A-9-75434
Patent document 2: JP-A-2006-109902
Patent document 3: JP-A-2006-348213
Patent document 4: WO2008-29932
Patent document 5: Japanese Patent No. 4448551

OUTLINE OF THE INVENTION

Problems that the Invention is to Solve

The above-mentioned resin composition containing ultrafine metal particles is the one in which ultrafine metal particles or, typically, ultrafine silver particles are dispersed in the resin, and is capable of effectively expressing excellent antibacterial property and adsorbing performance possessed by the ultrafine silver particles. In fact, the resin composition containing ultrafine silver particles has a very high deodorizing effect against the sulfur type bad-smelling components such as methyl mercaptan, hydrogen sulfide and methyl sulfide but its deodorizing effect is not sufficient against the nitrogen type bad-smelling components such as dimethylamine and trimethylamine. Therefore, there still remains room for improvement for efficiently deodorizing a variety of kinds of bad smells. It has, therefore, been quite naturally desired to further improve properties for deodorizing sulfur type bad-smelling components and antibacterial property.

It is, therefore, an object of the present invention to provide a resin composition containing ultrafine silver particles and having excellent antibacterial property as well as excellent deodorizing power against both the nitrogen type smelling components and the sulfur-containing smelling components.

Another object of the present invention is to provide a resin composition containing ultrafine silver particles and having excellent moldability, which can be molded or on which a coating can be formed at low temperatures.

A further object of the present invention is to provide a molded body which has excellent antibacterial property, and is capable of adsorbing not only sulfur-containing smelling components but also nitrogen-type smelling components such as trimethylamine, exhibiting very excellent effect of deodorizing bad-smelling components.

A still further object of the present invention is to provide a molded body that expresses antibacterial effect despite of containing silver in small amounts since it has been desired to decrease the content of silver from the economic point of view in the antibacterial field.

Means for Solving the Problems

According to the present invention, there is provided a resin composition containing ultrafine silver particles obtained by heating and mixing a resin composition, a silver carboxylate and a carboxylic acid together.

In the resin composition of the present invention, it is desired that:
1. The resin composition is a thermoplastic resin or a coating composition;
2. The silver carboxylate is an aliphatic silver carboxylate;
3. The carboxylic acid is an aliphatic carboxylic acid;
4. The carboxylic acid is an aliphatic carboxylic acid having 3 to 30 carbon atoms;
5. The carboxylic acid is at least one of stearic acid, palmitic acid, myristic acid, lauric acid or capric acid;
6. The silver carboxylate is at least one of silver stearate, silver palmitate, silver myristate, silver laurate or silver caprate;
7. The temperature at which the carboxylic acid starts decomposing is lower than a temperature at which the silver carboxylate starts decomposing; and 8. The carboxylic acid included in the above carboxylic acids is added in an amount of from 0.1 to 10 mols per mol of silver included in the silver carboxylates.

According to the present invention, further, there is provided a molded body having antibacterial property and deodorizing property, comprising the above resin composition containing ultrafine silver particles.

According to the present invention, further, there is provided a method of producing a resin composition containing ultrafine silver particles by heating and mixing a thermoplastic resin, a silver carboxylate and a carboxylic acid together at a temperature lower than a temperature at which the silver carboxylate starts decomposing but not lower than a melting point of the thermoplastic resin.

In the production method of the present invention, it is desired that the temperature for heating is lower than a temperature at which the carboxylic acid starts decomposing.

In producing the resin composition containing ultrafine silver particles by heating and mixing the resin composition and the silver carboxylate together according to the present invention, it was discovered that upon blending the thermoplastic resin or the coating composition with the carboxylic acid in addition to the silver carboxylate:

1) Strikingly improved deodorizing performance can be attained against the nitrogen type smelling components that could not be fully deodorized with the conventional silver-containing resin compositions;
2) Further improved deodorizing power is attained against the sulfur type smelling components; and
3) Further improved antibacterial power can be attained, i.e., antibacterial effect can be expressed with a small silver content.

The above actions and effects of the invention are also obvious from the results of Examples appearing later. Namely, the molded bodies obtained by blending a low-density polyethylene with the silver stearate followed by heating and mixing, are satisfactory in regard to methyl mercaptan deodorizing ratio and antibacterial property but their amine deodorizing ratio is very low (Comparative Examples 1 to 4). On the other hand, the molded bodies obtained by blending a low-density polyethylene with the silver stearate (thermal decomposition start temperature of 240° C.) and the carboxylic acid followed by heating and mixing, feature markedly improved amine deodorizing ratio and improved methyl mercaptan deodorizing ratio and antibacterial property (Examples 1 to 10).

Specifically, when the carboxylic acid is an aliphatic carboxylic acid such as octanoic acid, capric acid or lauric acid and, particularly, the lauric acid, the effects become distinguished (Examples 1, 5, 8 to 11). Upon adding the carboxylic acid, further, the antibacterial property and deodorizing property are improved; i.e., the antibacterial property becomes sufficient despite the silver content in the resin is small (Examples 11, 13 to 18).

Effects of the Invention

According to the invention, upon blending the thermoplastic resin or the coating composition with the silver carboxylate and the carboxylic acid, the resin composition (thermoplastic resin, coating) that contains ultrafine silver particles exhibits markedly improved antibacterial property and deodorizing property.

Specifically, the invention makes it possible to effectively deodorize nitrogen type smelling components that could not be fully deodorized with the conventional resin compositions containing ultrafine silver particles but not blended with the carboxylic acid.

Further, according to the present invention, the deodorizing power against the sulfur type smelling components is more improved than the conventional resins containing ultrafine silver particles but not blended with the carboxylic acid.

Further, according to the present invention, the antibacterial power is more improved than the conventional resins containing ultrafine silver particles but not blended with the carboxylic acid.

MODES FOR CARRYING OUT THE INVENTION

Upon blending the resin composition with the silver carboxylate and the carboxylic acid according to the invention, it is presumed that the above-mentioned desirable actions and effects are expressed owing to the following factors.

1) Namely, owing to the action of the carboxylic acid as a reducing agent, the ultrafine silver particles are more effectively formed. Besides, the carboxylic acid is partly configured on the surfaces of the ultrafine silver particles that are formed to suppress undesired aggregation or excessive growth of the ultrafine silver particles, enabling ultrafine silver particles having small particle sizes and narrow particle size distribution to be favorably dispersed in the thermoplastic resin or in the coating composition. As a result, the ultrafine silver particles express greatly reinforced deodorizing effect and antibacterial property against the sulfur type and nitrogen type smelling components.
2) The carboxylic acid added to the thermoplastic resin or the coating composition, by itself, can react with the amine. Therefore, in addition to the ultrafine silver particles, the carboxylic acid, too, contributes to more effectively deodorizing the nitrogen type bad-smelling components.

(Silver Carboxylates)

The silver carboxylate used in the present invention is an aliphatic silver carboxylate having 3 to 30 carbon atoms, which may be either saturated or unsaturated. Examples thereof include silver salts such as of caproic acid, caprylic acid, capric acid, lauric acid, myristic acid, palmitic acid, oleic acid, linoleic acid, linolenic acid, stearic acid and arachidinic acid. A straight-chain saturated fatty acid having 10 to 22 carbon atoms is preferably used because it is easily available and works to easily form a silver salt. On the other hand, use of a silver salt of a branched aliphatic carboxylic acid having many carbon atoms makes it possible to adsorb smelling components by the aliphatic carboxylic acid component itself to further improve the deodorizing effect. There may be used a plurality of kinds of silver carboxylates.

It is desired that the silver carboxylate has a water content of not more than 200 ppm. By mixing it with the resin followed by heating and molding, therefore, there is obtained a resin composition having excellent power for adsorbing bad-smelling substances.

In addition to the silver carboxylate, it is also allowable to use in combination a carboxylate of a metal such as Au, In, Pd, Pt, Fe, Nb, Ru, Rh, Sn, Ni, Cu, Co or Zn.

In the present invention, it is specifically desired to use silver decanoate, silver laurate, silver myristate, silver palmitate, silver stearate or silver behenate.

(Carboxylic Acids)

The carboxylic acid used for the resin composition of the present invention may be either an aliphatic saturated carboxylic acid or an aliphatic unsaturated carboxylic acid, and may, further, be a multivalent carboxylic acid not being limited to a monovalent carboxylic acid.

In order to greatly improve the deodorization of nitrogen type smelling components and to improve the deodorization of sulfur type smelling components and antibacterial property, it is desired to use the carboxylic acid of which the thermal decomposition temperature is lower than that of the silver carboxylate.

More desirably, the silver stearate is used as the silver carboxylate, and capric acid or lauric acid is used as the carboxylic acid.

(Thermoplastic Resins)

As the thermoplastic resin to which the silver carboxylate and the carboxylic acid are to be added, there can be used any known thermoplastic resin that is capable of being melt-molded. For example, there can be used olefin resins such as low-, intermediate- and high-density polyethylenes, linear low-density polyethylene, linear very low-density polyethylene, isotactic polypropylene, syndiotactic polypropylene, propylene-ethylene copolymer, ethylene-vinyl acetate copolymer, polymethylpentene, polystyrene, polybutene-1, ethylene-butene-1 copolymer, propylene-butene-1 copolymer and ethylene-propylene-butene-1 copolymer; polyester resins such as polyethylene terephthalate, polybutylene terephthalate and polyethylene napthate; polyamide resins such as nylon 6, nylon 6,6 and nylon 6, 10; polycarbonate resins; soft vinyl chloride resins; hard vinyl chloride resins; polyvinyl alcohols; methacrylic resins; and polyacetals.

To obtain the resin composition of the invention, the above-mentioned thermoplastic resin is blended with the silver carboxylate and carboxylic acid, followed by mixing and heating. Thereafter, the mixture is subjected to the known melt-molding such as two-roll method, injection molding, extrusion molding or compression molding to obtain an adsorptive molded resin article in a shape that meets the use as the finally molded article, such as granules, pellets, film, sheet or container.

The conditions for heat-molding or heat-treating the thermoplastic resin vary depending upon the kinds of the thermoplastic resin, silver carboxylate and carboxylic acid that are used, and cannot be exclusively specified. According to the present invention, however, it is possible to homogeneously disperse the ultrafine silver particles in the resin composition by conducting the heat molding or the heat treatment at a temperature lower than either a temperature at which the silver carboxylate starts thermally decomposing or a temperature at which the carboxylic acid starts thermally decomposing whichever is lower. In practice, the conditions are affected by the heat of shearing due to the screw and by the residence time in addition to the temperature set for the extruder. It is, therefore, desired that the heat treatment is conducted by adjusting the working conditions such as residence time, heating time, rotational speed of the screw and the like.

It is desired that the resin composition used in the invention uses a thermoplastic resin that has good permeability for the smelling gases to let the ultrafine silver particles in the resin composition to come into efficient contact with the smelling components. More desirably, polyethylene is used.

Depending upon the use, the resin composition of the invention may further contain a variety of known blending agents such as filler, plasticizer, leveling agent, viscosity-increasing agent, viscosity-decreasing agent, stabilizer, antioxidant, ultraviolet ray absorber, and coloring agents such as pigment and dye according to known recipe.

(Coating Compositions)

As the coating material component blended with the silver carboxylate and the carboxylic acid, there can be used a variety of components provided they are capable of forming a coating upon the heating. For example, though not limited thereto only, there can be used known coating compositions such as acrylic coating material, epoxy coating material, phenol coating material, urethane coating material, polyester coating material, alkyd resin coating material and silicone resin coating material.

The conditions for heat-treating the coating composition vary depending on the kinds of the coating composition and the silver carboxylate and cannot be exclusively specified. It is, however, necessary to conduct the heat treatment at a temperature lower than a temperature at which the silver carboxylate starts thermally decomposing for 60 to 600 seconds. The coating composition of the present invention is capable of forming a coating containing ultrafine silver particles by baking at a low temperature and makes it possible to prevent the plastic base body on which the coating composition is applied from being thermally deteriorated.

(Resin Compositions Containing Ultrafine Silver Particles)

The resin composition containing ultrafine silver particles of the present invention can be obtained by a very simple and generally employed method of heating and mixing the thermoplastic resin together with the silver carboxylate and the carboxylic acid.

According to the invention, the ultrafine silver particles that are formed in the resin composition can be confirmed based on a phenomenon called plasmon absorption in which the ultrafine silver particles absorb light of wavelengths over a range of from 300 to 700 nm.

It is desired that the ultrafine silver particles have a maximum diameter which is not larger than 1 μm and, specifically, have an average particle size in a range of from 1 to 100 nm.

In this specification, a particle stands for the one without gap between metal and metal, and the average particle size stands for an average value of the particles.

The ultrafine silver particles have, being configured on the surfaces thereof, the carboxylic acid stemming from the silver carboxylate as well as part of the carboxylic acid that is added. Therefore, the ultrafine silver particles have small particle sizes and a narrow particle size distribution expressing excellent deodorizing power and antibacterial power. Besides, owing to the presence of the carboxylic acid on their surfaces, the ultrafine silver particles have such features that they do not aggregate but very favorably disperse in the resin and, at the same time, effectively suppress the resin from decomposing and suppress a decrease in the molecular weight of the resin without impairing the moldability.

It is desired that the resin composition of the invention contains the silver carboxylate in an amount of from 0.01 to 10 parts by weight per 100 parts by weight of the thermoplastic resin or per 100 parts by weight of the resin component in the coating composition. If the amount thereof is smaller than the above range, the adsorptive effect is not obtained to a sufficient degree. If the amount thereof is larger than the above range, on the other hand, the moldability may decrease. If it is desired to obtain the antibacterial effect only, then the silver carboxylate may be added in an amount of from 0.001 to 1 part by weight and, specifically, from 0.001 to 0.1 part by weight per 100 parts by weight of the thermoplastic resin or per 100 parts by weight of the resin component in the coating composition. If the amount thereof is smaller than the above range, the antibacterially active value is not satisfied. On the other hand, the amount thereof that is larger than the above range is not desirable from the economic point of view.

In the resin composition of the present invention, further, it is desired that the carboxylic acid is contained in an amount of not less than one mole per mole of the silver carboxylate. If the amount thereof is less than one mole, the adsorptive property or the antibacterial property is not attained to a sufficient degree.

The molded resin article obtained from the resin composition of the invention has excellent antibacterial and deodorizing properties, and exhibits excellent antibacterial property and deodorizing property just after it is molded offering advantage in productivity and economy.

The amounts of adding the silver carboxylate and the carboxylic acid may be suitably determined from the above-mentioned ranges depending upon a desired function.

EXAMPLES

Example 1

A low-density polyethylene was mixed with a silver stearate and a lauric acid each in an amount of 0.5 wt %, and the mixture thereof was injection-molded into a test piece measuring 2.4 mm×2.9 mm×3.0 mm in thickness by using an injection-molding machine (manufactured by JSW Co.) set at a temperature of 180° C. Formation of ultrafine silver particles in the test piece was confirmed by a method that will be described later. The test piece was further evaluated for its methyl mercaptan deodorizing ratio, dimethylamine deodorizing ratio and antibacterial effect.

Example 2

A test piece was prepared and evaluated in quite the same manner as in Example 1 but using a myristic acid instead of the lauric acid used in Example 1.

Example 3

A test piece was prepared and evaluated in quite the same manner as in Example 1 but using a palmitic acid instead of the lauric acid used in Example 1.

Example 4

A test piece was prepared and evaluated in quite the same manner as in Example 1 but using a stearic acid instead of the lauric acid used in Example 1.

Example 5

A test piece was prepared and evaluated in quite the same manner as in Example 1 but using a silver myristate instead of the silver stearate used in Example 1.

Example 6

A test piece was prepared and evaluated in quite the same manner as in Example 5 but using the myristic acid instead of the lauric acid used in Example 5.

Example 7

A test piece was prepared and evaluated in quite the same manner as in Example 5 but using the stearic acid instead of the lauric acid used in Example 5.

Example 8

A test piece was prepared and evaluated in quite the same manner as in Example 1 but changing the amount of the silver stearate to 1.0 wt % and the amount of the lauric acid to 1.0 wt % in Example 1.

Example 9

A test piece was prepared and evaluated in quite the same manner as in Example 1 but changing the amount of the silver stearate to 5.0 wt % and the amount of the lauric acid to 5.0 wt % in Example 1.

Example 10

A test piece was prepared and evaluated in quite the same manner as in Example 1 but changing the amount of the lauric acid to 2.0 wt % in Example 1.

Example 11

A test piece was prepared and evaluated in quite the same manner as in Example 1 but changing the amount of the silver stearate to 0.1 wt % in Example 1.

Comparative Example 1

A test piece was prepared and evaluated in quite the same manner as in Example 1 but changing the amount of the silver stearate to 0.1 wt % and adding no lauric acid in Example 1.

Comparative Example 2

A test piece was prepared and evaluated in quite the same manner as in Example 1 but adding no lauric acid in Example 1.

Comparative Example 3

A test piece was prepared and evaluated in quite the same manner as in Example 1 but changing the amount of the silver stearate to 1.0 wt % and adding no lauric acid in Example 1.

Comparative Example 4

A test piece was prepared and evaluated in the same manner as in Example 5 but adding no lauric acid in Example 5.

Comparative Example 5

A test piece was prepared and evaluated in the same manner as in Comparative Example 2 but using a silver hexanoate instead of the silver stearate used in Comparative Example 2.

Comparative Example 6

A test piece was prepared and evaluated in the same manner as in Comparative Example 2 but using a silver laurate instead of the silver stearate used in Comparative Example 2.

Comparative Example 7

A test piece was prepared and evaluated in the same manner as in Example 1 but adding no silver stearate.

Comparative Example 8

A test piece was prepared and evaluated in the same manner as in Comparative Example 7 but using the stearic acid instead of the lauric acid used in Comparative Example 7.

Example 12

A high molecular bisphenol type epoxy resin, a phenol-formaldehyde resin (resol type) solution, a silver stearate and a lauric acid were mixed together at a resin ratio of 47.5:47.5:2.5:2.5 and were heated at 180° C. followed by the addition of a curing catalyst (phosphoric acid). Thereafter, a mixed solution (cyclohexanone:MIBK:MEK=1:1:1) was added thereto so that the concentration of the resin coating component was 20% to thereby prepare a primer. The primer was applied onto a biaxially oriented PET/I (terephthalic acid/isophthalic acid=88/12) copolymerized polyester film of a thickness of 50 μm in such an amount that the dry weight thereof was 0.6 g/m² followed by drying at 180° C. to prepare a primer-coated film. The film was cut into a square of a size of 5 cm to obtain a sample which was then evaluated in the same manner as in Example 1.

Comparative Example 9

A test piece was prepared and evaluated in the same manner as in Example 12 but without adding the lauric acid.

Comparative Example 10

A test piece was prepared and evaluated in the same manner as in Example 12 but without adding the silver stearate.

Example 13

To a low-density polyethylene resin, there were added 0.1 wt % of a silver stearate of which the decomposition start temperature has been calculated and 0.1 wt % of a lauric acid. By using a biaxial extrusion-molding machine (manufactured by Toyo Seiki Mfg. Co.), a mixture thereof was extruded under the molding conditions of an extrusion-molding machine setpoint temperature of 180° C. and Q (ejection amount)/N (rotational speed of screw)=4/150≈0.03 to obtain a film measuring 40 mm×40 mm having a thickness of 100 μm, and from which a test piece was obtained. Formation of ultrafine silver particles in the test piece was confirmed by the method that will be described later. The test piece was further evaluated for its antibacterial effect.

Example 14

A test piece was prepared and evaluated in quite the same manner as in Example 13 but changing the amount of the lauric acid to 0.5 wt % in Example 13.

Example 15

A test piece was prepared and evaluated in quite the same manner as in Example 14 but using the stearic acid instead of the lauric acid in Example 14.

Example 16

A test piece was prepared and evaluated in quite the same manner as in Example 13 but changing the amount of the silver stearate to 0.01 wt % and the amount of the lauric acid to 0.05 wt % in Example 13.

Example 17

To a low-density polyethylene resin, there were added 0.34 wt % of a silver stearate of which the decomposition start temperature has been calculated and 1.7 wt % of a lauric acid through a resin throw-in port. By using the biaxial extrusion-molding machine (manufactured by Technovel Co.), a mixture thereof was extruded into a stranded form under the molding conditions of an extrusion-molding machine set-point temperature of 140° C. and Q (ejection amount)/N (rotational speed of screw)=4/100=0.04 followed by cooling with water and pelletization to prepare a master batch thereof. The obtained master batch was dried at 50° C. for 24 hours. Next, 3882 g of the low-density polyethylene resin and 118 g of the master batch were mixed together, and a mixture thereof was thrown through the resin throw-in port and was molded by using a biaxial extrusion-molding machine (manufactured by Toyo Seiki Mfg. Co.) under the molding conditions of an extrusion-molding machine setpoint temperature of 210° C. and Q (ejection amount)/N (rotational speed of screw)=4/150≈0.03 to obtain a film measuring 40 mm×40 mm having a thickness of 100 μm, and from which a test piece was obtained. Formation of ultrafine silver particles in the test piece was confirmed by the method that will be described later. The test piece was further evaluated for its antibacterial effect.

Example 18

A test piece was prepared and evaluated in quite the same manner as in Example 13 but changing the amount of the lauric acid to 0.05 wt % in Example 13.

Comparative Example 11

A test piece was prepared and evaluated in quite the same manner as in Example 13 but adding the silver stearate only in an amount of 0.1 wt % in Example 13.

Comparative Example 12

A test piece was prepared and evaluated in quite the same manner as in Example 13 but changing the amount of the lauric acid to 0.025 wt % in Example 13.

Comparative Example 13

A test piece was prepared and evaluated in quite the same manner as in Example 13 but changing the setpoint temperature to 260° C. in Example 13.

Comparative Example 14

A test piece was prepared and evaluated in quite the same manner as in Example 13 but changing the setpoint temperature to 230° C. in Example 13.

[Measuring the Temperature at which the Decomposition Starts]

The temperatures at which the silver carboxylates used in Examples and Comparative Examples start thermally decomposing are temperatures at which the carboxylic acid portion starts dissociate or decompose from the metal portion. The temperature at which the thermal decomposition starts was measured relying upon the thermogravimetry (TG) by measuring the masses of the silver carboxylate and carboxylic acid, and measuring changes in the weights thereof when the temperature was elevated in an inert atmosphere by using a thermogravimetic apparatus in compliance with the JIS K 7120. The decomposition start temperature was calculated from a thermogravimetric curve (TG curve) obtained by the measurement. The start temperature refers to a temperature at a point where a line in parallel with an axis of abscissa passing through a mass of before starting the test heating, intersects a tangential line of which the gradient becomes a maximum between the bending points on the TG curve.

[Confirming the Formation of Ultrafine Silver Particles]

By using an ultraviolet ray/visible ray spectrophotometer (manufactured by Nihon Bunko Co.), the test pieces obtained in Examples and Comparative Examples were measured for their diffusion, reflection and absorption spectra to confirm the formation of ultrafine silver particles. It has been known that the ultrafine silver particles having particle sizes of not larger than 100 nm develop plasmon absorption near a wavelength of 420 nm since free electrons receive oscillation due to a photoelectric field. It can, therefore, be said that the ultrafine silver particles having particle sizes of not lager than 100 nm are contained in the test piece that exhibits absorption near the wavelength of 420 nm in the diffusion, reflection and absorption spectra. Therefore, the results of evaluation of Tables 1 and 2 include the plasmon absorption as the formation of ultrafine silver particles.

[Methyl Mercaptan Deodorizing Ratio]

(Measuring the Amount of Methyl Mercaptan Before Deodorized)

By using a micro-syringe, 5 μl of a bad-smelling methyl mercaptan was injected into a 500-ml glass bottle purged with a nitrogen gas and of which the mouth portion was sealed with a rubber plug, and was left to stand at room temperature (25° C.) for one day. After left to stand for one day, a detector manufactured by Gastech Co. was inserted in the bottle to measure the amount of the remaining methyl mercaptan, which was then regarded to be the amount (A) of the methyl mercaptan before deodorized.

(Measuring the Amount of Methyl Mercaptan after Deodorized)

The 500-ml glass bottle purged with the nitrogen gas and into which the obtained test piece has been introduced was sealed with the rubber plug. Thereafter, by using the micro-syringe, 5 μl of the bad-smelling methyl mercaptan was injected into the bottle, and was left to stand at room temperature (25° C.) for one day. After left to stand for one day, a detector manufactured by Gastech Co. was inserted in the bottle to measure the amount of the remaining methyl mercaptan, which was then regarded to be the amount (B) of the methyl mercaptan after deodorized.

(Calculating the Methyl Mercaptan Deodorizing Ratio)

A value obtained by subtracting the amount (B) of the methyl mercaptan after deodorized from the amount (A) of the methyl mercaptan before deodorized, was divided by the amount (A) of the methyl mercaptan before deodorized and was regarded to be a deodorizing ratio in percentage. The deodorizing ratios were evaluated in five stages as described below and were shown in Tables 1 and 2.

| Deodorizing ratio evaluated to be | Deodorizing ratio |
|---|---|
| A | 100 to 80% |
| B | 80 to 60% |
| C | 60 to 40% |
| D | 40 to 20% |
| E | 20 to 0% |

[Dimethylamine Deodorizing Ratio]

(Measuring the Amount of Dimethylamine Before Deodorized)

By using a micro-syringe, 5 μl of a bad-smelling dimethylamine was injected into a 500-ml glass bottle purged with the nitrogen gas and of which the mouth portion was sealed with a rubber plug, and was left to stand at room temperature (25° C.) for one day. After left to stand for one day, a detector manufactured by Gastech Co. was inserted in the bottle to measure the amount of the remaining dimethylamine, which was then regarded to be the amount (A) of the dimethylamine before deodorized.

(Measuring the Amount of Dimethylamine after Deodorized)

The 500-ml glass bottle purged with the nitrogen gas and into which the obtained test piece has been introduced was sealed with the rubber plug. Thereafter, by using the micro-syringe, 5 μl of the bad-smelling dimethylamine was injected into the bottle, and was left to stand at room temperature (25° C.) for one day. After left to stand for one day, the detector manufactured by Gastech Co. was inserted in the bottle to measure the amount of the remaining dimethylamine, which was then regarded to be the amount (B) of the dimethylamine after deodorized.

(Calculating the Dimethylamine Deodorizing Ratio)

A value obtained by subtracting the amount (B) of the dimethylamine after deodorized from the amount (A) of the dimethylamine before deodorized, was divided by the amount (A) of the dimethylamine before deodorized and was regarded to be a deodorizing ratio in percentage. The deodorizing ratios were evaluated in five stages as described below and were shown in Tables 1, 2 and 3.

| Deodorizing ratio evaluated to be | Deodorizing ratio |
|---|---|
| A | 100 to 80% |
| B | 80 to 60% |
| C | 60 to 40% |
| D | 40 to 20% |
| E | 20 to 0% |

[Evaluating the Antibacterial Effect]

The antibacterial effect was confirmed in compliance with the JIS Z 2801. The bacterial strain that was used was either Escherichia coli or Staphylococcus aureus. Values obtained by dividing the numbers of bacteria of the test pieces containing neither silver carboxylate nor carboxylic acid after cultured for 24 hours by the numbers of bacteria of the test pieces of Examples and Comparative Examples after cultured for 24 hours, in logarithm were regarded as antibacterially active values. The antibacterial effect was evaluated to be ○ when the antibacterially active values were not less than 2.0 and were evaluated to be × when the antibacterially active values were less than 2.0.

TABLE 1

| | Blended | | | | | | | |
|---|---|---|---|---|---|---|---|---|
| | Fatty acid silver | *1 | *2 | Aliphatic carboxylic acid | *1 | *2 | Mole ratio | Molding temp. [° C.] |
| Ex. 1 | silver stearate | 240 | 0.5 | lauric acid | 225 | 0.5 | 2.0 | 180 |
| Ex. 2 | silver stearate | 240 | 0.5 | myristic acid | 250 | 0.5 | 1.7 | 180 |
| Ex. 3 | silver stearate | 240 | 0.5 | palmitic acid | 351 | 0.5 | 1.5 | 180 |
| Ex. 4 | silver stearate | 240 | 0.5 | stearic acid | 376 | 0.5 | 1.4 | 180 |
| Ex. 5 | silver myristate | 230 | 0.5 | lauric acid | 225 | 0.5 | 1.7 | 180 |
| Ex. 6 | silver myristate | 230 | 0.5 | myristic acid | 250 | 0.5 | 1.5 | 180 |
| Ex. 7 | silver myristate | 230 | 0.5 | stearic acid | 376 | 0.5 | 1.5 | 180 |
| Ex. 8 | silver stearate | 240 | 1 | lauric acid | 225 | 1 | 5 | 180 |
| Ex. 9 | silver stearate | 240 | 5 | lauric acid | 225 | 5 | 5 | 180 |
| Ex. 10 | silver stearate | 240 | 0.5 | lauric acid | 225 | 2 | 7.8 | 180 |
| Ex. 11 | silver stearate | 240 | 0.1 | lauric acid | 225 | 0.5 | 9.8 | 180 |
| Comp. Ex. 1 | silver stearate | 240 | 0.1 | — | — | — | — | 180 |
| Comp. Ex. 2 | silver stearate | 240 | 0.5 | — | — | — | — | 180 |
| Comp. Ex. 3 | silver stearate | 240 | 1 | — | — | — | — | 180 |
| Comp. Ex. 4 | silver myristate | 230 | 0.5 | — | — | — | — | 180 |
| Comp. Ex. 5 | silver hexanoate | 280 | 0.5 | — | — | — | — | 180 |
| Comp. Ex. 6 | silver laurate | 280 | 0.5 | — | — | — | — | 180 |
| Comp. Ex. 7 | — | — | — | lauric acid | 225 | 0.5 | — | 180 |
| Comp. Ex. 8 | — | — | — | stearic acid | 376 | 0.5 | — | 180 |

| | Ultrafine silver ptcls. in resin Plasmon absorption | Methyl mercaptan Deodorizing ratio [%] | Dimethylamine Deodorizing ratio [%] | Bacteria (*Escherichia coli*) Antibacterial effect |
|---|---|---|---|---|
| Ex. 1 | yes | B | A | ○ |
| Ex. 2 | yes | C | B | ○ |
| Ex. 3 | yes | C | B | ○ |
| Ex. 4 | yes | C | C | ○ |
| Ex. 5 | yes | B | A | ○ |
| Ex. 6 | yes | B | B | ○ |
| Ex. 7 | yes | C | C | ○ |
| Ex. 8 | yes | B | A | ○ |
| Ex. 9 | yes | A | A | ○ |
| Ex. 10 | yes | B | A | ○ |
| Ex. 11 | yes | C | A | ○ |
| Comp. Ex. 1 | yes | C | E | X |
| Comp. Ex. 2 | yes | C | E | ○ |
| Comp. Ex. 3 | yes | C | E | ○ |
| Comp. Ex. 4 | yes | C | E | ○ |
| Comp. Ex. 5 | yes | 66 (B) | 37 (D) | ○ |
| Comp. Ex. 6 | yes | 59 (C) | 23 (D) | ○ |
| Comp. Ex. 7 | no | E | B | X |
| Comp. Ex. 8 | no | E | D | X |

*1: Decomposition start temp. [° C.]
*2: Amount of addition [wt %]

TABLE 2

| | Blended | | | | | | | |
|---|---|---|---|---|---|---|---|---|
| | Fatty acid silver | *1 | *2 | Aliphatic carboxylic acid | *1 | *2 | Mole ratio | Molding temp. [° C.] |
| Ex. 12 | silver stearate | 240 | 0.5 | lauric acid | 225 | 0.5 | 2.0 | 180 |
| Comp. Ex. 9 | silver stearate | 240 | 0.5 | — | — | — | — | 180 |
| Comp. Ex. 10 | — | — | — | lauric acid | 225 | 0.5 | — | 180 |

| | Ultrafine silver ptcls. in resin Plasmon absorption | Methyl mercaptan Deodorizing ratio [%] | Dimethylamine Deodorizing ratio [%] | Bacteria (*Escherichia coli*) Antibacterial effect |
|---|---|---|---|---|
| Ex. 12 | yes | B | A | ○ |
| Comp. Ex. 9 | yes | B | E | ○ |
| Comp. Ex. 10 | no | E | A | X |

*1: Decomposition start temp. [° C.]
*2: Amount of addition [wt %]

TABLE 3

|  | *1 | *3 | *4 | Blended *5 | *3 | *4 | *8 | *9 | *10 *11 | *12 *13 |
|---|---|---|---|---|---|---|---|---|---|---|
| Ex. 13 | *2 | 240 | 0.1 | *6 | 225 | 0.1 | 2.0 | 180 | yes | ○ |
| Ex. 14 | *2 | 240 | 0.1 | *6 | 225 | 0.5 | 9.8 | 180 | yes | ○ |
| Ex. 15 | *2 | 240 | 0.1 | *7 | 376 | 0.5 | 6.9 | 180 | yes | ○ |
| Ex. 16 | *2 | 240 | 0.01 | *6 | 225 | 0.05 | 9.8 | 180 | yes | ○ |
| Ex. 17 | *2 | 240 | 0.01 | *6 | 225 | 0.05 | 9.8 | 210 | yes | ○ |
| Ex. 18 | *2 | 240 | 0.1 | *6 | 225 | 0.05 | 1.0 | 180 | yes | ○ |
| Comp. Ex. 11 | *2 | 240 | 0.1 | — | — | — | — | 180 | yes | X |
| Comp. Ex. 12 | *2 | 240 | 0.1 | *6 | 225 | 0.025 | 0.5 | 180 | yes | X |
| Comp. Ex. 13 | *2 | 240 | 0.1 | *6 | 225 | 0.1 | 2.0 | 260 | yes | X |
| Comp. Ex. 14 | *2 | 240 | 0.1 | *6 | 225 | 0.1 | 2.0 | 230 | yes | X |

*1: Fatty acid silver;
*2: silver stearate;
*3: Decomposition start temp. [° C.];
*4: Amount of addition [wt %];
*5: Aliphatic carboxylic acid;
*6: lauric acid;
*7: stearic acid;
*8: Mole ratio;
*9: Molding temp. [° C.];
*10: Ultrafine silver ptcls. in resin;
*11: Plasmon absorption;
*12: Bacteria (*Staphylococcus aureus*);
*13: Antibacterial effect

INDUSTRIAL APPLICABILITY

The resin composition and coating composition of the present invention have excellent antibacterial property as well as excellent deodorizing power against both the nitrogen type smelling components and the sulfur-containing smelling components, and can be provided in a variety of forms such as granules, pellets, fibers, films, sheets and containers, or in the form of a coating on the surfaces of the molded articles and can, therefore, be utilized in various fields of industries.

The invention claimed is:

1. A resin composition containing ultrafine silver particles which have an average particle size in a range of from 1 to 100 nm, obtained by heating and mixing a resin composition, a silver carboxylate and a carboxylic acid together.

2. The resin composition containing ultrafine silver particles according to claim 1, wherein said resin composition is a thermoplastic resin or a coating composition.

3. The resin composition containing ultrafine silver particles according to claim 1, wherein said carboxylic acid is at least one of stearic acid, palmitic acid, myristic acid, lauric acid or capric acid.

4. The resin composition containing ultrafine silver particles according to claim 1, wherein said silver carboxylate is at least one of silver stearate, silver palmitate, silver myristate, silver laurate or silver caproate.

5. The resin composition containing ultrafine silver particles according to claim 1, wherein the temperature at which said carboxylic acid starts decomposing is lower than a temperature at which said silver carboxylate starts decomposing.

6. The resin composition containing ultrafine silver particles according to claim 1, wherein the carboxylic acid included in said carboxylic acids is added in an amount of from 0.1 to 10 mols per mol of silver included in said silver carboxylates.

7. A method of producing a resin composition containing ultrafine silver particles by heating and mixing a thermoplastic resin, a silver carboxylate and a carboxylic acid together at a temperature lower than a temperature at which the silver carboxylate starts decomposing but not lower than a melting point of the thermoplastic resin.

8. The method of producing a resin composition containing ultrafine silver particles according to claim 7, wherein the temperature for heating is lower than a temperature at which the carboxylic acid starts decomposing.

* * * * *